UNITED STATES PATENT OFFICE.

AUGUST V. KIRKEBY, OF WEST NUTLEY, NEW JERSEY.

COMPOSITION OF MATTER FOR ADHESIVE SIZING.

1,085,919. Specification of Letters Patent. Patented Feb. 3, 1914.

No Drawing. Application filed June 12, 1912, Serial No. 703,301. Renewed June 19, 1913. Serial No. 774,703.

*To all whom it may concern:*

Be it known that I, AUGUST V. KIRKEBY, a citizen of the United States, and a resident of West Nutley, county of Essex, and State of New Jersey, have invented a new and useful Composition of Matter for Adhesive Sizing, of which the following is a full, clear, and exact specification.

My composition has for its object to provide an adhesive sizing designed to be employed in conjunction with the customary paste by decorators and paperhangers for adhering wall paper, burlap, canvas, lincrusta, and fabrics to the walls interiorly of buildings, or other structures, and which will permit the decorations to be applied upon painted, varnished, calcimined, or lime washed walls, thus dispensing with the requirement of first removing such finishings before applying the decorations as is incident to the ordinary methods.

My composition of matter consists of the following ingredients, combined in the proportions stated, viz:—Venice turpentine 3 pounds, glucose 5 pounds, caustic soda 1 pound, calcium carbonate ½ pound. The ingredients are mixed together by agitation in a suitable receptacle and then subjected to sufficient heat so as to boil for a period during which time the mixture is agitated at required intervals. When the mixture has cooled by any desired process a paste is formed and in order to be employed for adhering decorations upon a wall one pint of the paste is incorporated in any suitable manner in two and one half gallons of the ordinary flour paste used by decorators and paperhangers. The combined ingredients are then used in the usual way by spreading a suitable coating of the mixture of sizing and paste upon the wall paper, burlap, canvas, lincrusta, or other fabric, and the decoration is applied upon the wall by any of the usual means.

A paste containing my adhesive sizing will not stain the most delicately tinted wall papers or decorative fabrics, and will permit the decorations to be readily removed from a wall by the use of water owing to being free from the susceptibility of incrustation which is characteristic of the properties of the flour pastes used for such purposes.

Having thus described my invention, I claim as new and desire to secure by Letters Patent:—

1. The herein described composition of matter, comprising Venice turpentine, glucose, and an alkali, substantially as described and for the purpose specified.

2. The herein described composition of matter, consisting of Venice turpentine, glucose, an alkali, and a compound of an alkaline earth metal, substantially as described and for the purpose specified.

3. The herein described composition of matter, comprising Venice turpentine three pounds, glucose five pounds, and an alkali one pound, substantially as described and for the purpose specified.

4. The herein described composition of matter, consisting of Venice turpentine three pounds, glucose five pounds, caustic soda one pound, and calcium carbonate one-half pound, substantially as described and for the purpose specified.

This specification signed and witnessed this seventh day of June, A. D. 1912.

AUGUST V. KIRKEBY.

Witnesses:
ROBT. B. ABBOTT,
M. DERMODY.